(12) United States Patent  (10) Patent No.: US 9,399,542 B1
Davison  (45) Date of Patent: Jul. 26, 2016

(54) CONDIMENT CONTAINER AND ASSOCIATED METHOD

(76) Inventor: Bryan Davison, Evanston, WY (US)

( * ) Notice: Subject to any disclaimer, the term of this patent is extended or adjusted under 35 U.S.C. 154(b) by 1514 days.

(21) Appl. No.: 12/698,721

(22) Filed: Feb. 2, 2010

Related U.S. Application Data (60) Provisional application No. 61/149,156, filed on Feb. 2, 2009.

(51) Int. Cl.
| | | |
|---|---|---|
| *B65D 6/00* | (2006.01) |
| *B65D 8/04* | (2006.01) |
| *B65D 8/18* | (2006.01) |
| *B65D 90/02* | (2006.01) |
| *B65D 77/20* | (2006.01) |
| *B65D 81/32* | (2006.01) |
| *B65D 83/00* | (2006.01) |
| *B65D 77/30* | (2006.01) |
| *B65D 85/72* | (2006.01) |

(52) U.S. Cl.
CPC ........ *B65D 83/0094* (2013.01); *B65D 81/3205* (2013.01)

(58) Field of Classification Search
CPC ........... B65D 2313/08; B65D 81/3205; B65D 77/2044; B65D 77/30; B65D 83/0094; B65D 85/72; B65D 2231/02; B65D 35/04; B65D 35/08
USPC .............................. 220/678, 23.2, 23.4, 23.86
See application file for complete search history.

(56) References Cited

U.S. PATENT DOCUMENTS

| | | | |
|---|---|---|---|
| 2,795,121 A | | 6/1957 | Pantello |
| 3,595,446 A | * | 7/1971 | Hellstrom ..................... 222/213 |
| 5,429,262 A | | 7/1995 | Sharkey |
| 5,540,333 A | * | 7/1996 | Gonzalez et al. ............. 206/541 |
| 5,667,119 A | | 9/1997 | Florence |
| 6,193,201 B1 | | 2/2001 | Babcock |
| 6,230,969 B1 | * | 5/2001 | Spransy ........................ 229/400 |
| 6,364,112 B1 | | 4/2002 | Pitschka |
| 6,419,153 B1 | * | 7/2002 | Maita ............................ 229/400 |

* cited by examiner

*Primary Examiner* — Fenn Mathew
*Assistant Examiner* — Andrew T Kirsch
(74) *Attorney, Agent, or Firm* — Useful Arts IP (57) ABSTRACT

A condiment container may include a portable body preferably having a planar back side and a planar bottom side monolithically formed therewith. The body may include a curvilinear front side monolithically formed with the back and bottom sides respectively. An open top side may be oppositely disposed from the bottom side. The front side may include first and second lines of weakness linearly extending along a longitudinal length thereof. In this way, the front side may be selectively biased between folded and unfolded positions by displacing the first and second lines of weakness inwardly and outwardly from the back side respectively. The back, front and bottom sides may further define a hollow interior cavity adapted to receive the condiments when the front side is biased to the unfolded position. The hollow interior cavity may further be collapsed when the front side is biased to the folded position.

5 Claims, 7 Drawing Sheets

CONDIMENT CONTAINER AND ASSOCIATED METHOD

CROSS REFERENCE TO RELATED APPLICATIONS

This application claims the benefit of U.S. Provisional Application No. 61/149,156, filed Feb. 2, 2009, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to food containers and, more particularly, to a condiment container for providing users with an easy and convenient means of placing their food condiments in an easily accessible manner for consumption.

2. Prior Art

The invention of drive-thru restaurants allows patrons to pick up food in a quick and efficient manner. These establishments allow patrons to order and pick up their meals without having to leave their cars thus saving customers' time by not having to exit their vehicles in order to place and receive a meal order. All in all, this saves busy patrons valuable time in their hectic schedules. The ability to save time by picking up meals from a drive-thru has led patrons to seek other ways in which to save time.

One such way is to multi-task. Many fast food patrons multi-task by eating their meals while driving. It is therefore, no surprise that fast food restaurants specialize in serving food that can be eaten by hand without the need for a knife and fork. Meals like burgers and other sandwiches are popular at these establishments. Often times a patron will receive French fries with their sandwich. By themselves, French fries are very easy to eat while driving, but if the user wishes to adorn the fries with ketchup or some other condiment, then multi-tasking gets a bit harder. Usually, the user will struggle to tear open a ketchup packet and squirt it directly onto the fries or onto a food wrapper in order to dip the fries into. This can be a difficult task when driving because the wrapper tends to slide when the driver executes a turn and the driver's hands can get very messy.

Accordingly, a need remains for an apparatus in order to overcome the above-noted shortcomings. The present invention satisfies such a need by providing a condiment container that is convenient and easy to use, is durable yet lightweight in design, is versatile in its applications, and provides a means of placing food condiments in an easily accessible manner for consumption.

BRIEF SUMMARY OF THE INVENTION

In view of the foregoing background, it is therefore an object of the present invention to provide an apparatus for receiving and providing condiments in an easily accessible manner during food consumption. These and other objects, features, and advantages of the invention are provided by a condiment container.

The condiment container may include a portable body preferably having a planar back side and a planar bottom side monolithically formed therewith. The body may further include a curvilinear front side monolithically formed with the back and bottom sides respectively. An open top side may further be oppositely disposed from the bottom side. The front side may include first and second lines of weakness linearly extending along a longitudinal length thereof.

In this way, the front side may be selectively biased between folded and unfolded positions by displacing the first and second lines of weakness inwardly and outwardly from the back side respectively. The back, front and bottom sides may further define a hollow interior cavity adapted to receive the condiments when the front side is biased to the unfolded position. The hollow interior cavity may further be collapsed when the front side is biased to the folded position. Such an arrangement provides the unexpected and unpredictable advantage of having a handy container for receiving the condiment whereby a user may be able to dip a french fry or a chip for example, into the open top side when the container is in its unfolded state and further to be able to squeeze the container to its folded state to extract the condiment from the container if necessary.

A diameter of the hollow interior cavity may further be decreased and increased when the front side is folded and unfolded along the first and second lines of weakness. In this way, the diameter of the hollow interior cavity may be decreased when the first and second lines of weakness are positioned inwardly along the back side. Conversely, the diameter of the hollow interior cavity may be increased when the first and second lines of weakness are positioned outwardly away from the back side. Such an arrangement provides the unexpected and unpredictable advantage of squeezing the condiment from the container easily without having to contort and possibly breaking the sides of container when dispensing the condiment from the container.

The back side may include a rectangular center portion situated along a first plane. A first and a second wing may be laterally extended away from a first and a second longitudinal edge of the center portion respectively. The first and second wings may further be selectively pivotal along mutually exclusive arcuate paths defined about the first and second longitudinal edges respectively. In this way, the first and second wings may be selectively offset from the first plane. A flange portion may further extend upwardly from a top edge of the back side and may be provided with a third and fourth line of weakness laterally running across an entire width thereof. In this way, the back side may be selectively biased to a non-linear shape when the flange portion is folded about the third and fourth lines of weakness. Such an arrangement provides the unexpected and unpredictable advantage of easily folding the wings over the sides of a curvilinear shaped food carton enabling the back side to wrap around the carton comfortably. The flange portion may further be folded over a carton opening for additional hold.

The back side further may include a first adhesive layer coated on a posterior face of the back side. A first protective layer may be removably connected to the first adhesive layer. A first tab may further be monolithically formed with an outer edge of the first protective layer. In this way, the tab may be gripped by a user's fingers to tear the protective layer to expose the adhesive layer easily. Such an arrangement provides the unexpected and unpredictable advantage of conveniently and speedily allowing a user to stick the adhesive coated back side onto a carton of food to operate both carton and container as a single unit.

A top cover may be removably affixed to the open top side for prohibiting undesirable fluid and debris from entering the hollow interior cavity during non-use conditions. The top cover may include a primary portion preferably having a curvilinear outer edge coextensively conjoined to an outer perimeter of the open top side. A second tab may be monolithically formed with the primary portion and be disposed outwardly and away from the outer perimeter when the primary portion is affixed to the open top side. Such an arrangement provides the unexpected and unpredictable advantage of ensuring a hygienic way of storing the condiment while further providing an easy and convenient way of opening the top of the container to access the condiment.

The bottom side may include a second adhesive layer coated on a posterior face of the bottom side. A second protective layer may be removably connected to the second adhesive layer. A third tab may further be monolithically formed with an outer edge the second protective layer thereof. Such an arrangement provides the unexpected and unpredictable advantage of allowing the container to be placed on a dashboard console of a vehicle for example in such a manner that users may comfortably consume their food with the condiment without distracting themselves while driving.

The invention may include a method of utilizing a condiment container for receiving and providing condiments in an easily accessible manner during food consumption. Such a method may include the chronological steps of: providing a portable body preferably having a planar back side and a planar bottom side monolithically formed therewith; providing the body with a curvilinear front side monolithically formed with the back and bottom sides respectively; providing the body with an open top side oppositely disposed from the bottom side; providing the front side to include first and second lines of weakness linearly extending along a longitudinal length thereof; and providing the back, front and bottom sides to define a hollow interior cavity therebetween.

The method may further include the steps of: providing and selectively biasing the front side between folded and unfolded positions by displacing the first and second lines of weakness inwardly and outwardly from the back side respectively; providing and biasing the front side to the unfolded position; providing and depositing the condiments inside the hollow interior cavity; and providing and collapsing the hollow interior cavity by biasing the front side to the folded position.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

Those skilled in the art will appreciate that the figures are not intended to be drawn to any particular scale; nor are the figures intended to illustrate every embodiment of the invention. The invention is not limited to the exemplary embodiments depicted in the figures or the shapes, relative sizes or proportions shown in the figures.

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The apparatus of this invention is referred to generally in FIGS. 1-7 by the reference numeral 10 and is intended to provide a condiment container. It should be understood that the condiment container 10 may be used for receiving and providing a variety of condiments in an easily accessible manner during food consumption such as french-fries, for example.

Referring generally to FIGS. 1-7, the condiment container 10 may include a portable body 20 preferably having a planar back side 21 and a planar bottom side 22 monolithically formed therewith. The body 20 may further include a curvilinear front side 23 monolithically formed with the back and bottom sides 21, 22 respectively. An open top side 24 may further be oppositely disposed from the bottom side 22. The front side 23 may include first and second lines of weakness 25, 26 linearly extending along a longitudinal length thereof. In this way, the front side 23 may be selectively biased between folded and unfolded positions by displacing the first and second lines of weakness 25, 26 inwardly and outwardly from the back side 21, respectively, as perhaps best shown in FIG. 6.

The back, front and bottom sides 21, 23, 22 may further define a hollow interior cavity 27 adapted to receive the condiments when the front side 23 is biased to the unfolded position. It is noted that condiments may be positioned in the cavity 27 when the front side 23 is also at the unfolded position. The hollow interior cavity 27 may be collapsed when the front side 23 is biased to the folded position. Such an arrangement provides the unexpected and unpredictable advantage of having a handy container 10 for receiving the condiment whereby a user may be able to dip a french fry or a chip for example, into the open top side 24 when the container 10 is in its unfolded state and further to be able to squeeze the container 10 to its folded state to extract the condiment from the container 10 if necessary.

Figure 5:
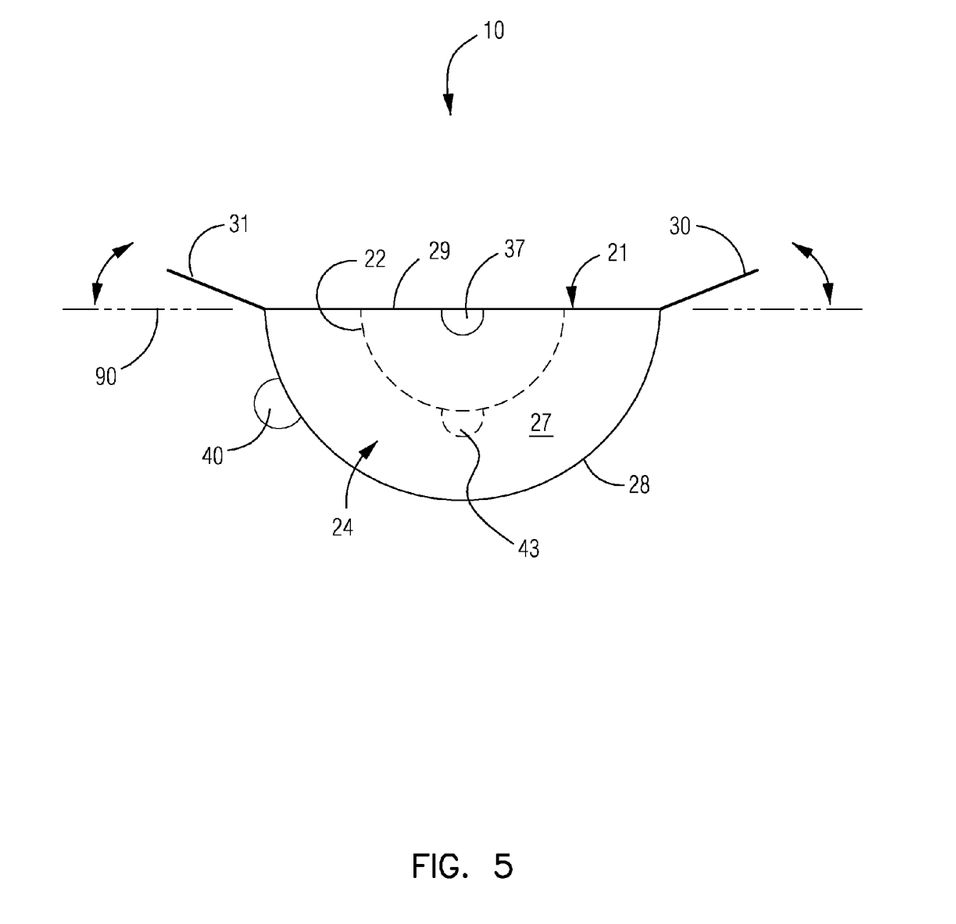
FIG. 5 is a top plan view of the condiment container shown in FIG. 4.
Figure 6:
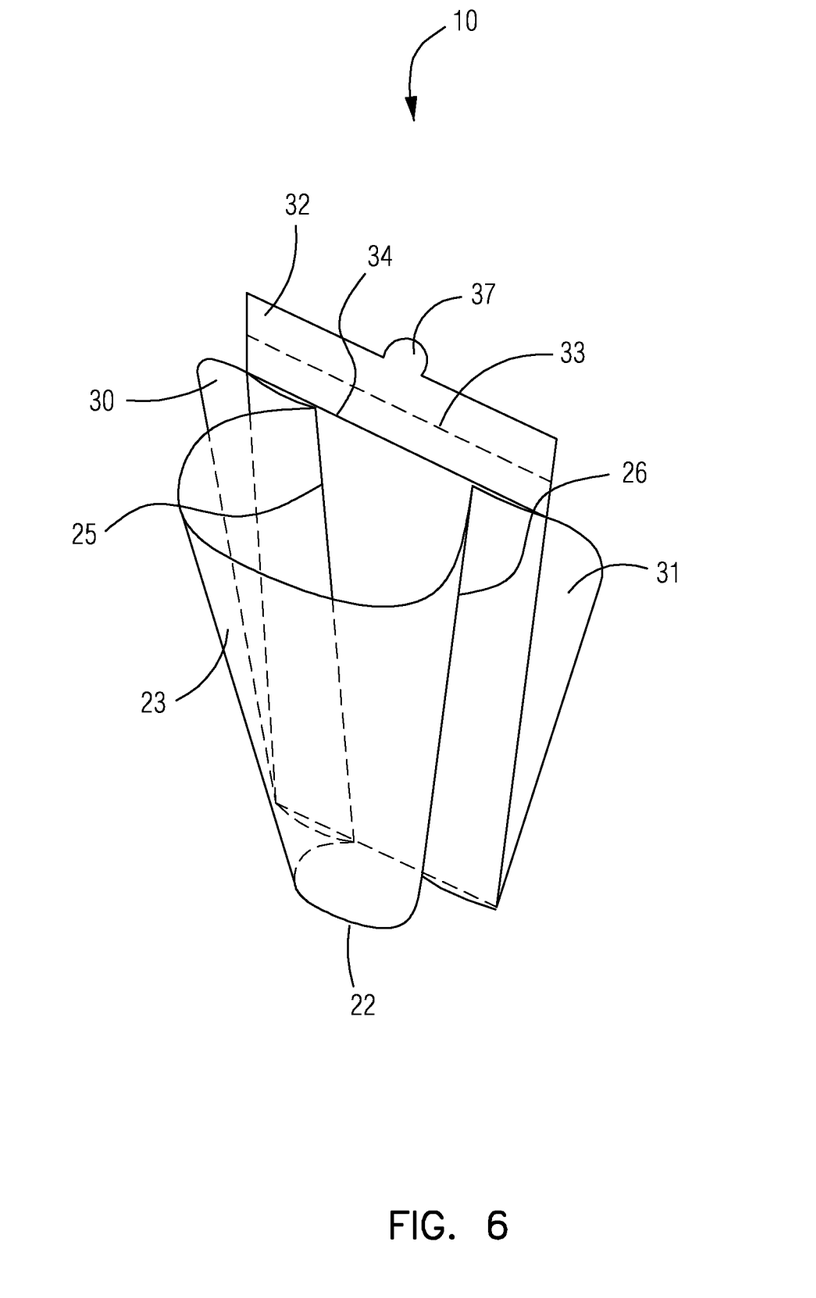
FIG. 6 is a perspective view showing front side folded along the lines of weakness and thereby reducing a diameter of the cavity.

Referring to FIGS. 5 and 6, a diameter 28 of the hollow interior cavity 27 may be decreased and increased when the front side 23 is folded and unfolded along the first and second lines of weakness 25, 26. In this way, the diameter 28 of the hollow interior cavity 27 may be decreased when the first and second lines of weakness 25, 26 are positioned inwardly along the back side 21. Conversely, the diameter 28 of the hollow interior cavity 27 may be increased when the first and second lines of weakness 25, 26 are positioned outwardly away from the back side 21. Such an arrangement provides the unexpected and unpredictable advantage of easily squeezing the condiment from the container 10 without having to distort and tear the container 10 when reaching condiment residue from the container 10 bottom.

Referring to FIGS. 1-5, the back side 21 may include a rectangular center portion 29 situated along a first plane 90. A first wing 30 and a second wing 31 may be laterally extended away from a first and a second longitudinal edge 91, 92 of the center portion 29, respectively. The first and second wings 30, 31 may further be selectively pivotal along mutually exclusive arcuate paths defined about the first and second longitudinal edges 91, 92, respectively. In this way, the first and second wings 30, 31 may be selectively offset from the first plane 90. A flange portion 32 may further extend upwardly from a top edge of the back side 21 and may be provided with third and fourth lines of weakness 33, 34 laterally running across an entire width thereof.

In this way, the back side 21 may be selectively biased to a non-linear shape when the flange portion 32 is folded about the third and fourth lines of weakness 33, 34. Such an arrangement provides the unexpected and unpredictable advantage of easily folding the wings 30, 31 over the sides of a curvilinear shaped food carton enabling the back side 21 to wrap around the carton comfortably. The flange portion 32 may further be folded over a carton opening for additional hold.

Figure 1:
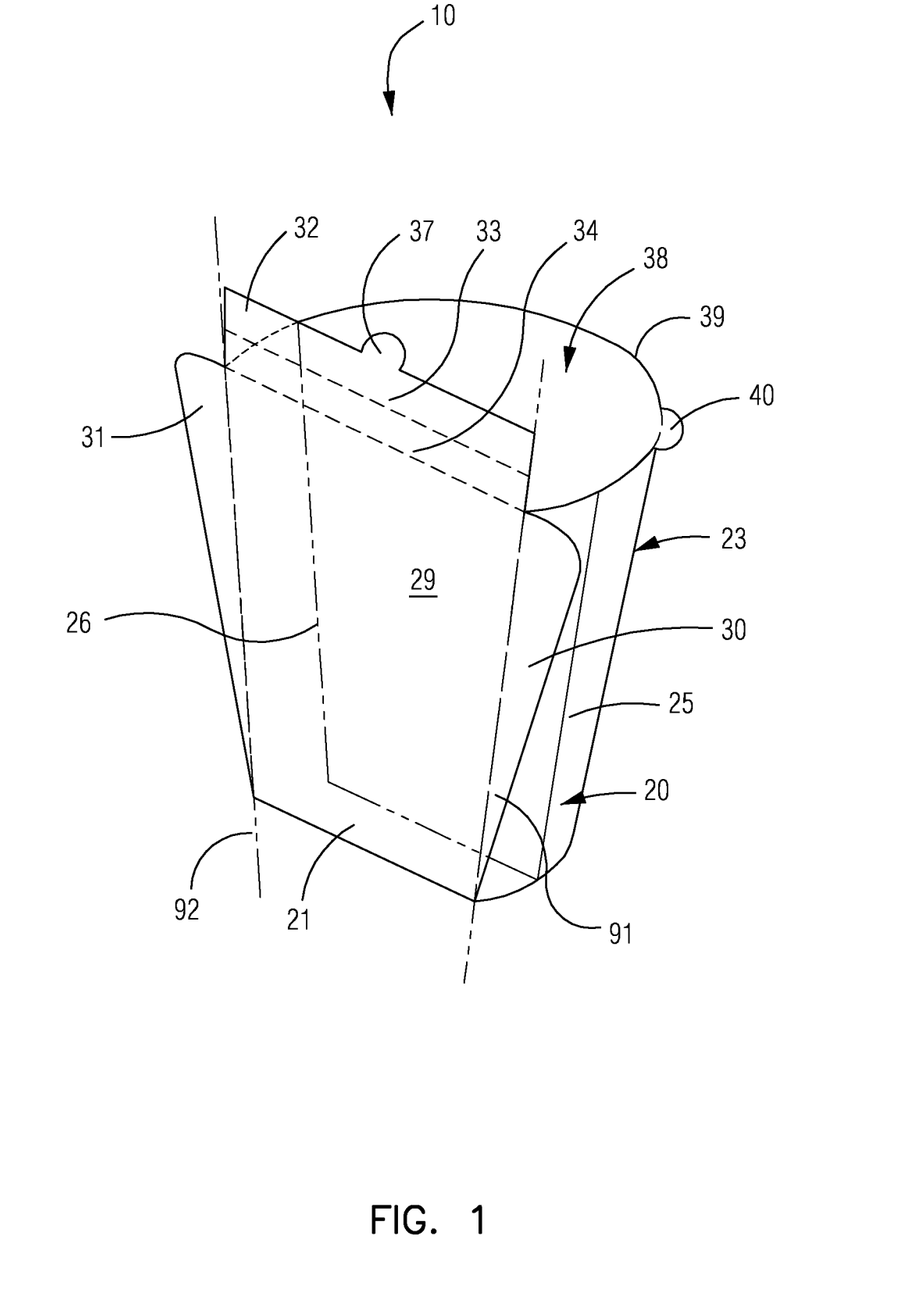
FIG. 1 is a perspective view showing a condiment container, in accordance with the present invention.
Figure 2:
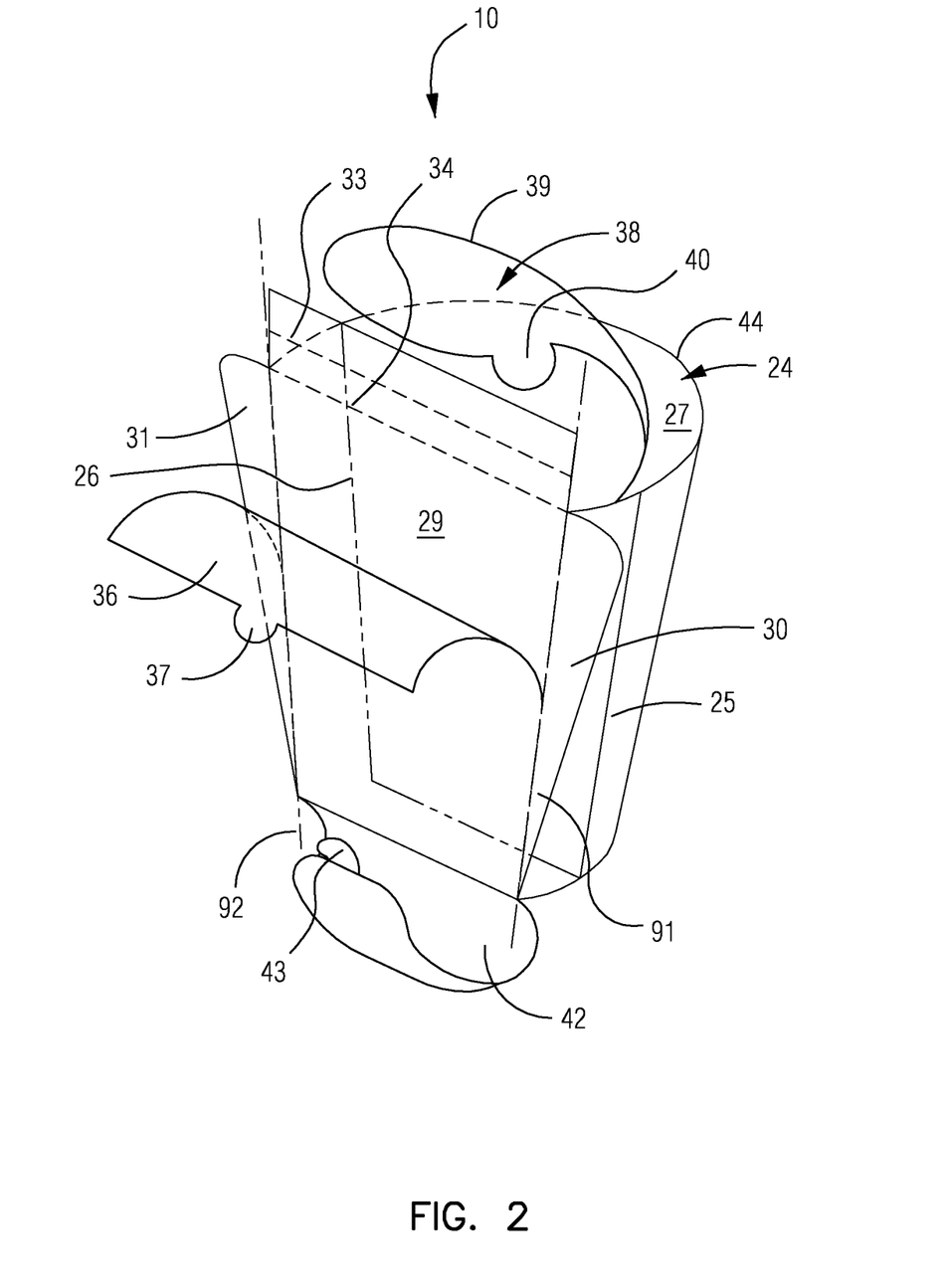
FIG. 2 is a perspective view showing a top cover and first and second protective layers peeled away to an open position respectively.
Figure 3:
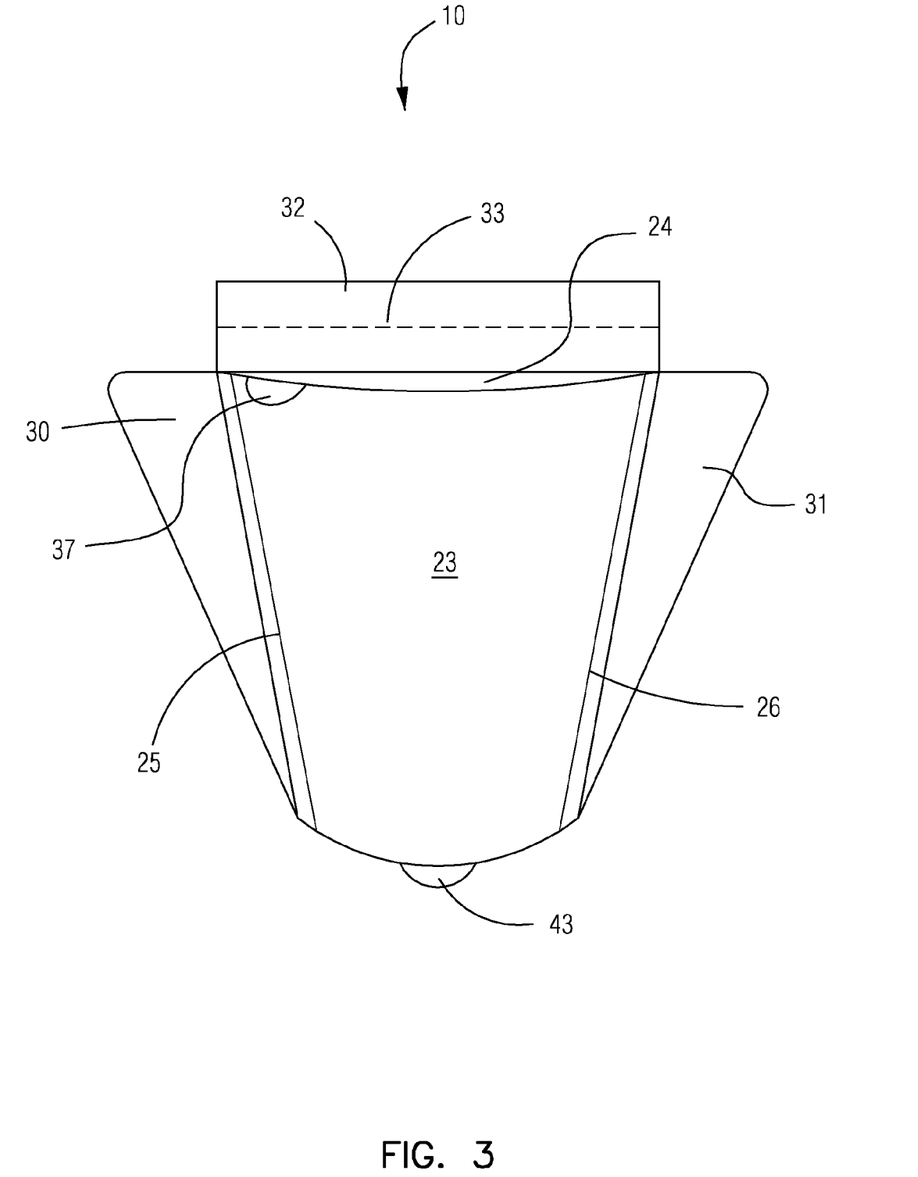
FIG. 3 is a front elevational view of the condiment container shown in FIG. 1.
Figure 4:
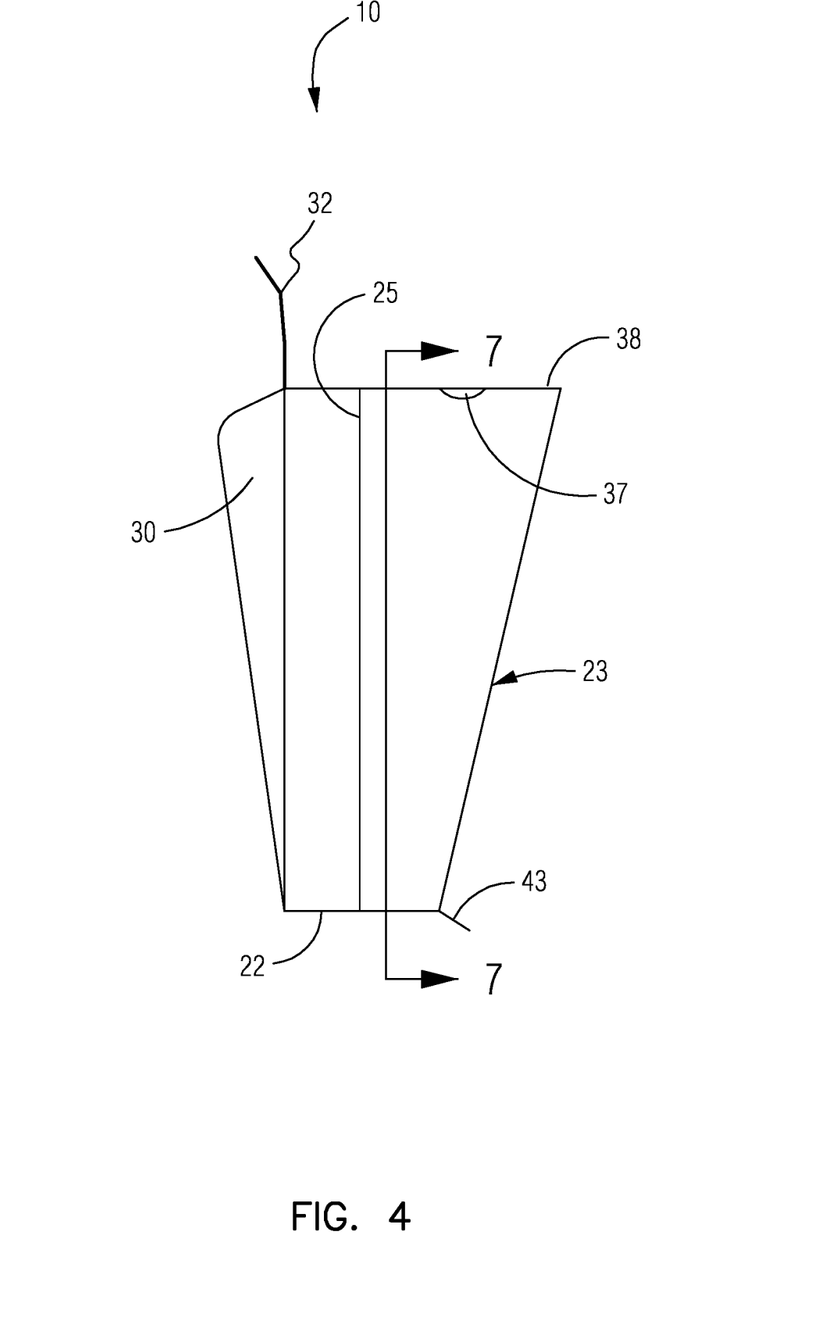
FIG. 4 is a side elevational view showing a wing of the back side in a non-planar position.
Figure 7:
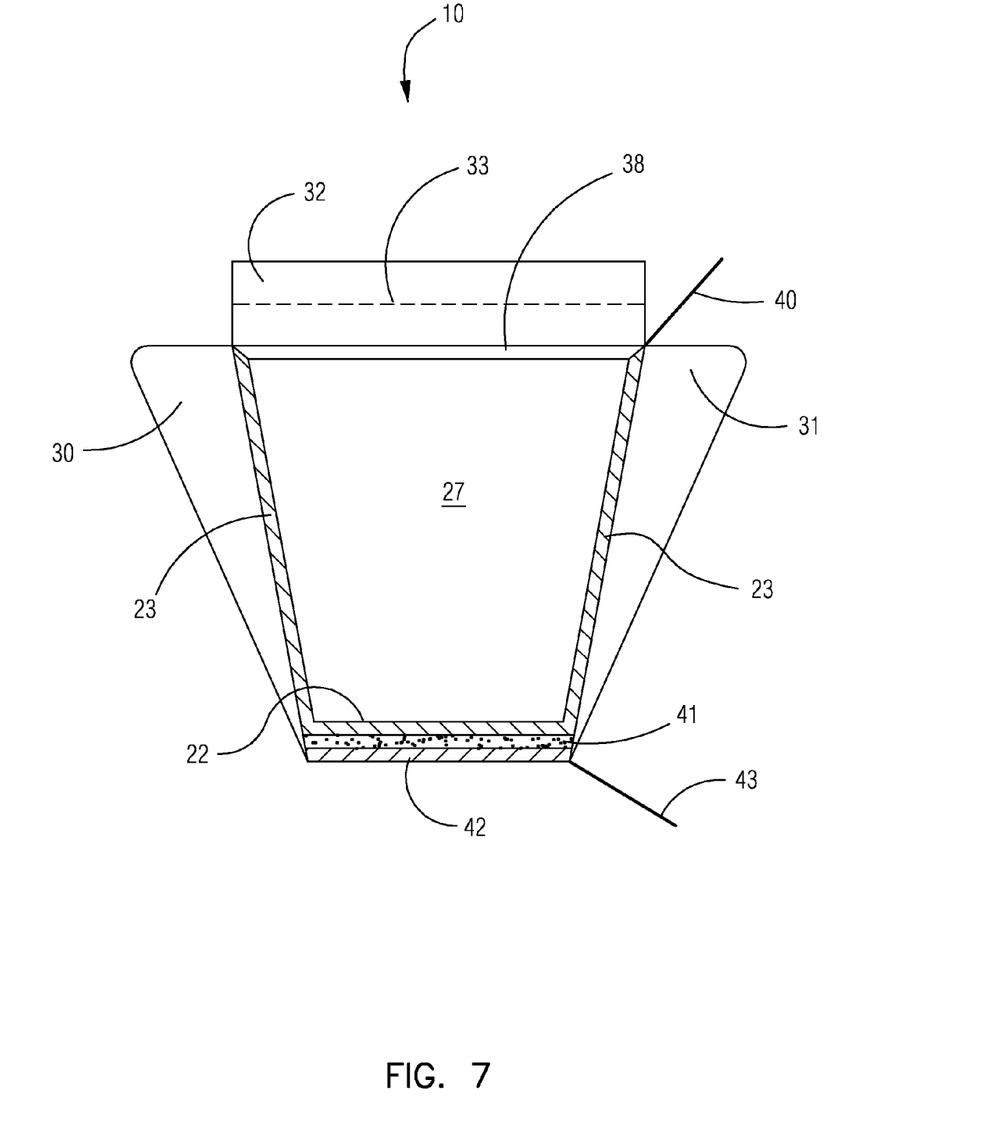
FIG. 7 is a cross-sectional view taken along line 7-7 in FIG. 4 showing the adhesive layers.

Referring now to FIGS. 1, 2 and 7, the back side 21 may further include a first adhesive layer 35 coated on a posterior face of the back side 21. A first protective layer 36 may be removably connected to the first adhesive layer 35. A first tab 37 may be monolithically formed with an outer edge of the first protective layer 36. In this way, the tab 37 may be gripped by a user's fingers to tear the protective layer to expose the adhesive layer 35 easily. Such an arrangement provides the unexpected and unpredictable advantage of conveniently and speedily allowing a user to stick the adhesive coated back side 21 onto a carton of food to operate both carton and container 10 as a single unit.

Referring to FIGS. 1, 2, 3 and 7, the top cover 38 may be removably affixed to the open top side 24 for prohibiting undesirable fluid and debris from entering the hollow interior cavity 27 during non-use conditions. The top cover 38 may include a primary portion 39 preferably having a curvilinear outer edge coextensively conjoined to an outer perimeter 44 of the open top side 24. A second tab 40 may be monolithically formed with the primary portion 39 and be disposed outwardly and away from the outer perimeter 44 when the primary portion 39 is affixed to the open top side 24. Such an arrangement provides the unexpected and unpredictable advantage of ensuring a hygienic way of storing the condiment while further providing an easy and convenient way of opening the top of the container 10 to access the condiment.

Referring to FIGS. 2 and 7, the bottom side 22 may include a second adhesive layer 41 coated on a posterior face of the bottom side 22. A second protective layer 42 may be removably connected to the second adhesive layer 41. A third tab 43 may be monolithically formed with an outer edge the second protective layer 42 thereof. Such an arrangement provides the unexpected and unpredictable advantage of allowing the container 10 to be placed on a dashboard console of a vehicle, for example, in such a manner that users may comfortably consume their food with the condiment without distracting themselves while driving.

The present invention may include a method of utilizing a condiment container 10 for receiving and providing condiments in an easily accessible manner during food consumption. Such a method may include the initial steps of: providing a portable body 20 preferably having a planar back side 21 and a planar bottom side 22 monolithically formed therewith. Such a body 20 further has a curvilinear front side 23 monolithically formed with the back and bottom sides 21, 22 respectively. Body 20 also has with an open top side 24 oppositely disposed from the bottom side 22. The front side 23 includes first and second lines of weakness 25, 26 linearly extending along a longitudinal length thereof. Further, the back, front and bottom sides 21, 23, 22 define a hollow interior cavity 27 therebetween.

The method may further include the chronological steps of: selectively biasing the front side 23 between folded and unfolded positions by displacing the first and second lines of weakness 25, 26 inwardly and outwardly from the back side 21 respectively; biasing the front side 23 to the unfolded position; depositing the condiments inside the hollow interior cavity 27; and collapsing the hollow interior cavity 27 by biasing the front side 23 to the folded position.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The combination of such claimed elements provides an unpredictable and unexpected benefit of enabling fast food customers to enjoy their french fries and chips with their associated condiments, solving the problem of having to squeeze out the condiments from plastic packages onto the fries without making a mess, especially when eating on the go.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A condiment container comprising an opening through which the condiment is withdrawn by dipping a foodstuff therein, and an adhesive layer attached to a side of the condiment container for adhering the condiment container to a foodstuff container having an opening through which the foodstuff is withdrawn by hand, such that following said adhering the opening of the condiment container and the opening of the foodstuff container both face upward;

wherein the condiment container comprises at least one feature that facilitates squeezing of the condiment container to expel at least a majority of the contents thereof.

2. A combination of a condiment container and a foodstuff container, comprising:

a condiment container comprising an opening through which the condiment is withdrawn by dipping a foodstuff therein, and an adhesive layer attached to a side of the condiment container for adhering the condiment container to the foodstuff container; and a foodstuff container having an opening through which the foodstuff is withdrawn by hand;

such that following said adhering the opening of the condiment container and the opening of the foodstuff container both face upward;

wherein the condiment container comprises at least one feature that facilitates squeezing of the condiment container to expel at least a majority of the contents thereof.

3. A condiment container comprising an opening through which the condiment is withdrawn by dipping a foodstuff therein, and an adhesive layer attached to a side of the condiment container for adhering the condiment container to a foodstuff container;

wherein the condiment container comprises at least one feature that facilitates squeezing of the condiment container to expel at least a majority of the contents thereof.

4. A container comprising an opening through which contents are expelled or withdrawn, and an adhesive layer attached to a side of the container for adhering the container to an article;

wherein the condiment container comprises at least one feature that facilitates squeezing of the condiment container to expel at least a majority of the contents thereof.

5. A method of consuming a condiment contained in a condiment container comprising an opening through which the condiment is withdrawn by dipping a foodstuff therein, the method comprising adhering the condiment container to a foodstuff container having an opening through which the foodstuff is withdrawn by hand, such that following said adhering the opening of the condiment container and the opening of the foodstuff container both face upward; and squeezing the condiment container to eject at least a majority of the contents thereof.

\* \* \* \* \*